May 4, 1943.  E. A. JONES  2,318,228
CONTROL MEANS FOR HEATING DEVICES
Filed May 25, 1940
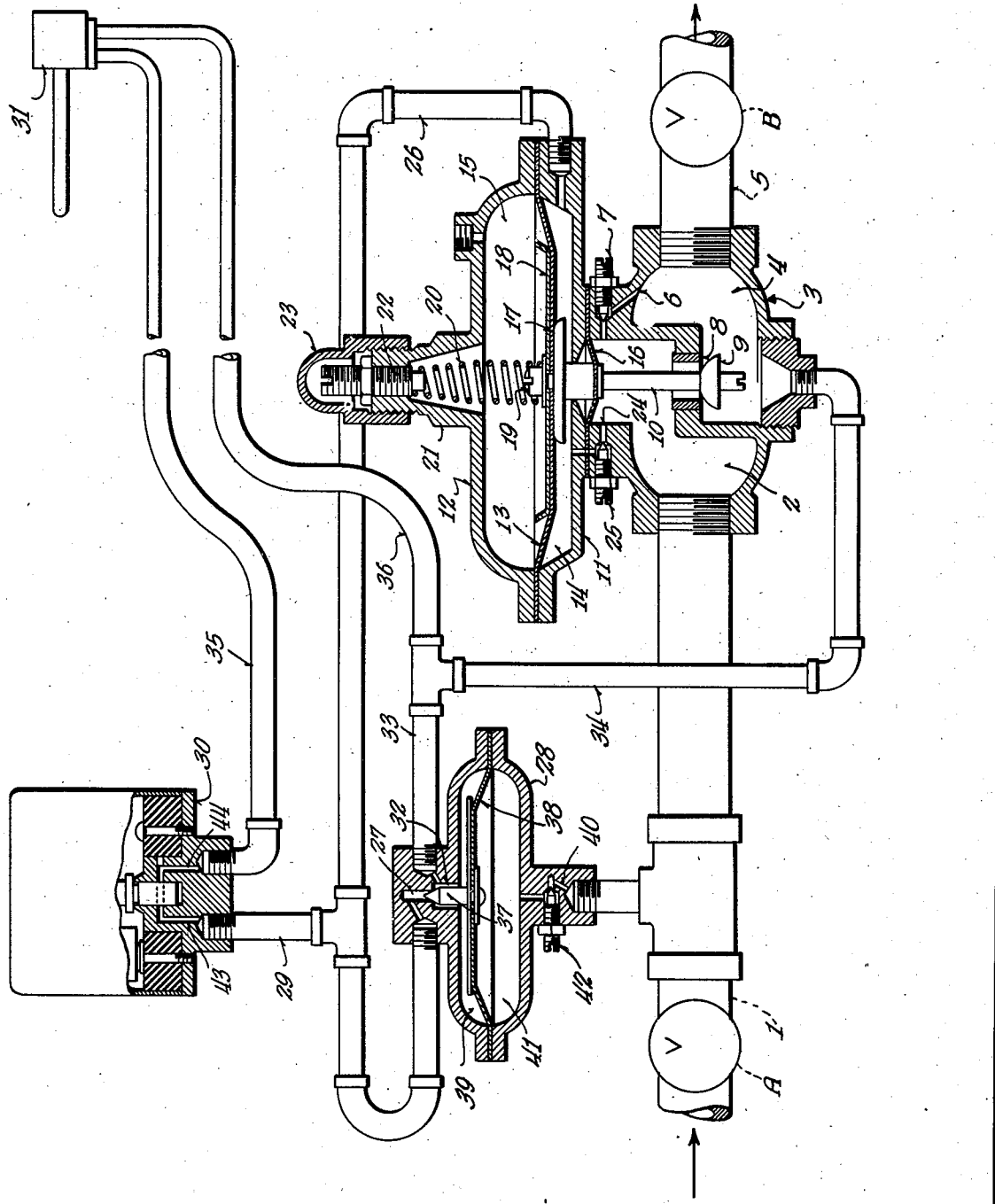
INVENTOR.
EDWIN A. JONES
BY Arthur R. Woolfolk
ATTORNEY.

Patented May 4, 1943

2,318,228

UNITED STATES PATENT OFFICE 2,318,228

CONTROL MEANS FOR HEATING DEVICES

Edwin A. Jones, Shorewood, Wis.

Application May 25, 1940, Serial No. 337,133

9 Claims. (Cl. 236—80)

This invention relates to control means for heating devices.

Objects of this invention are to provide a novel apparatus for the control of one ingredient of a combustible mixture to be supplied to heating means whereby the control device always comes on at regulated pressure so that there is no chance, even under the conditions of excessively high pressure in the supply mains, of a sudden rush of the ingredient, for example gas or air, to the burner, but instead in which the flow of the one ingredient of the combustible mixture is always under regulated pressure, irrespective of whether the modulating regulator starts from full closed or from full open position.

Further objects are to provide an apparatus for controlling one ingredient of a combustible mixture in such a manner that not only does the combustible mixture come on or be supplied at regulated pressure, but also the apparatus so functions that it is impossible for the burner to flash back as there is always an ample supply of fuel during the ingition period.

In greater detail, further objects of this invention are to provide a modulating regulator and associated apparatus which is so constructed that there is a time delay interval between the time the fuel is first supplied to the burner under regulated pressure and the time at which this supplied fuel is then further modulated in accordance with varying conditions, such as temperature, pressure, or other conditions produced by the burner.

In other words, this invention contemplates the provision of a modulating regulator and a time delay device that automatically operates to first allow the modulating regulator to supply one ingredient of the combustible mixture at the regulated pressure and to thereafter operate so as to place the modulating regulator under the control of a condition responsive device or under the control of a plurality of condition responsive devices.

Further objects are to provide a combined modulating regulator and time delay device in which the time delay device may be adjusted to obtain a predetermined time delay for the purposes hereinabove specified, and in which this time delay is automatically secured without any thought on the part of the operator.

Further objects are to provide a time delay device and a modulating regulator associated with a condition responsive means or with a plurality of condition responsive means in which provision is made for adjusting the minimum flow around the modulating regulator to thereby maintain a minimum flame and to provide adjustable means to simultaneously vary the speed at which the modulating regulator itself will operate and also to vary the differential of the thermostat or pressurestat, or other condition responsive means, and to so construct the modulating regulator that the regulated pressure at which the ingredient of the combustible mixture is first supplied may also be adjusted to the particular requirements of the heating apparatus or burner.

In greater detail, objects of this invention are to provide a fluid actuated modulating regulator which is normally controlled by condition responsive means, and to provide a fluid actuated time delay means which is automatic in its action and when the flow of fuel has been stopped, moves to such a position that it by-passes the condition responsive means and causes the modulating regulator to immediately move to regulated pressure upon the initial flow of the ingredient of the combustible mixture to the burner, and after a predetermined lapse of time, to place the modulating regulator under the control of the condition responsive means so that the modulating regulator thereafter operates under the control of the condition responsive means.

An embodiment of this invention is shown in the accompanying drawing, in which the single figure shows in section a modulating regulator and a time delay device and the manner in which they are associated with condition responsive means.

The modulating regulator may be employed to control one ingredient of the combustible mixture, for instance either the fuel or the air. For example, if the modulating regulator controls the supply of fuel, such as gas for instance, it acts directly as the control means of the fuel flow, whereas if the modulating regulator is employed to control the air flow, it is used in conjunction with the customary zero pressure regulator which in turn controls the gas flow. The zero pressure regulator has not been shown as it is a well known apparatus.

With the understanding that the modulating regulator is employed to control either ingredient of a combustible mixture, it will be described, in order to obtain simplicity of description, as controlling the gas supply.

Referring to the drawing, it will be seen that the gas supply pipe 1 communicates with the inlet chamber 2 of the modulating regulator indicated generally at 3, and that the modulating regulator controls the communication between the inlet chamber 2 and the outlet chamber 4, such outlet chamber communicating by means of a discharge pipe 5 with a burner, not shown. A minimum flame by-pass duct 6 is provided which by-passes the modulating regulator and is controlled by means of a manually adjustable needle valve 7 or the like to thereby set the apparatus for the particular amount of fuel required for minimum flame operation.

The inlet and outlet chambers 2 and 4 of the modulating regulator are separated by a transverse partition in which a valve seat 8 is provided, and a valve 9 carried by the stem 10 of the modulating regulator cooperates with the valve seat to open or close the passage from the chamber 2 to the chamber 4, or to move to any intermediate position for modulating purposes.

The modulating regulator comprises an upper portion consisting of a lower casing member 11 and an upper casing member 12 between which a diaphragm or movable wall 13 is positioned. The lower chamber 14 is the pressure chamber and the upper chamber 15 is in communication with the outside air or with any vent desired, the diaphragm 13 being moved by the relative difference in pressure between the two chambers 14 and 15.

A small sealing diaphragm 16 prevents communication between the inlet chamber 2 of the modulating regulator and the pressure chamber 14, and this diaphragm may be clamped to the stem 10 of the pressure regulator and between the lower portion of the pressure regulator and the casing structure 11.

It is preferable to provide a plate or flange 17 on the valve stem 10 and to locate such disk or flange below the diaphragm 13, a larger disk 18 being positioned above the diaphragm and the two being held clamped to the diaphragm by means of a screw 19, or in any other suitable manner.

A compression spring 20 fits over the screw 19 and is thereby centered at its lower end. This compression spring extends upwardly into the neck portion 21 of the modulating regulator and is seated on the reduced end of an adjustable screw 22, the screw being locked by means of a lock nut and preferably its upper end being covered by a removable cap 23 threaded on the upper end of the neck 21. In this manner the regulated pressure at which the device first functions during the initial flow of the fuel is adjustable to any predetermined value.

A duct 24 provides communication between the inlet chamber 2 and the pressure chamber 14 of the modulating regulator and this duct or passageway is for the purpose of supplying pressure fluid beneath the diaphragm.

An adjustment is provided by means of the needle valve 25 so that the rate at which this pressure fluid flows into the chamber 14 may be manually adjusted to any predetermined value. This adjustment determines the rate at which pressure gas will be supplied. It also determines the differential through which the condition responsive means must move in order to cause the modulating regulator to function, as will be obvious hereinafter.

The pressure chamber 14 communicates freely with a bleed pipe 26 which extends to the inlet side or opening 27 of a time delay device 28. The pipe 26 also has a branch line indicated at 29 which passes to a condition responsive means or to a plurality of condition responsive means, two of such means being shown and being indicated at 30 and 31. The time delay device also has an outlet chamber 32 which communicates by means of a pipe 33 with the discharge pipe 34 which leads to the discharge chamber 4 of the modulating regulator.

The devices 30 and 31 are connected in series by means of the pipe 35 and the discharge pipe from the last of these devices is indicated at 36 and communicates with the discharge pipe 34. It is to be understood that the exhaust passage from the pressure chamber 14 through the pipes 26 and 34 to the discharge chamber 4 of the modulating regulator is free and substantially unrestricted when the needle valve 37 of the time delay device is in open position.

The time delay device 28 consists essentially of a pair of casing members between which a diaphragm 38 is clamped, such diaphragm carrying a valve 37, a larger upper plate and a smaller lower plate being preferably provided on opposite sides of the diaphragm. These plates provide weight for the diaphragm so that the diaphragm is biased towards its lowest position. Obviously a spring could be employed if desired. The upper chamber 39, it will be noted, communicates freely with the pipe 33 as the stem of the valve 37 is smaller than the discharge chamber 32 of the time delay device. This time delay device is supplied with fluid pressure directly from the inlet pipe 1 by way of the duct or passageway 40. The rate at which pressure fluid is supplied to the lower or pressure chamber 41 of the time delay device is controlled by the manually adjustable needle valve 42 so that any time interval desired may be obtained, as will appear more fully hereinafter. It is not intended that the description of a needle valve is restrictive, as obviously other constricting devices could be used, such as are well known in the art.

It is to be noted in considering the time delay device that the chambers 41 and 39 are each in reality pressure chambers and are respectively in communication with the inlet and outlet sides of the modulating regulator so that this time delay device in effect is an auxiliary valve responsive to difference in pressure on opposite sides of the modulating regulator when fluid flow is established through the modulating regulator.

The condition responsive means 30 may be a heat motor such as that described in greater detail in my copending application Serial No. 337,134, filed May 25, 1940, for Modulating control system and automatic control means for a heating device. This heat motor is controlled from any suitable point, for example by a room thermostat not shown, so that when electrical energy is supplied, it causes the heat motor to function to cut off communication between its inlet passage 43 and its outlet passage 44, thereby cutting off communication between the pipe 29 and the pipe 35. Any number of condition responsive means can be employed and are connected in series as indicated for the two shown at 30 and 31, though they could be connected in parallel. When connected in series, all must cooperate to cause the modulating valve to open, and when connected in parallel, all must cooperate to cause the modulating valve to close.

The condition responsive means 31 may be a throttling thermostat to control communication between the pipe 35 and the pipe 36 and may be placed at any suitable point, in the bonnet of the furnace for instance or in a boiler or in the return duct, or at any other point desired. It is to be distinctly understood that throttling thermostats or pressurestats or other condition responsive means can be used, a throttling thermostat having been shown for the purpose of illustration.

From the description it will be apparent that when the time delay device is in closed position as shown in the figure, that there is no communication through this time delay device provided between the chamber 14 and the outlet chamber 4 of the modulating regulator. Any communication that exists between these two points is provided through the condition responsive means.

It is also apparent that when the time delay device is in open position, that is, when the diaphragm 38 has descended, that there is free and direct communication between the pressure chamber 14 and the discharge chamber 4 of the modulating regulator. In other words, the time delay device by-passes the condition responsive means and directly connects the lower pressure chamber 14 of the modulating regulator with the discharge side of such regulator by a free and relatively unrestricted passage so that when fuel is first supplied, the modulating regulator will move to regulated pressure, as the communication between the outlet side of the modulating regulator and the pressure chamber 14 is so much greater than the restricted high pressure passage through the duct 24. It is obvious that the device could be supplied with a manual or automatic main cut-off valve either ahead of or following the modulating regulator, as indicated at A and B. The devices could operate under manual control or under automatic control. If a cut-off valve A were employed ahead of the modulating regulator, it is obvious that when the valve is closed, that the modulating regulator would move to fully open position. Under these conditions, the time delay device would move to open position as there would be no pressure in its pressure chamber 41. When the fuel is turned on, it would take an interval of time to fill the chamber 41 of the time delay device with pressure fluid, and consequently during this interval of time the pressure chamber 14 of the modulating regulator would be in direct and free communication with the outlet side or the outlet chamber of the modulating regulator, and consequently the modulating regulator would immediately move to regulating position and it would be impossible for a blast of fuel to be furnished the burner, but instead fuel would be supplied the burner under regulated pressure.

Thereafter as this interval of time elapsed, the pressure chamber 41 of the time delay device would fill with the pressure fluid and the fluid above the diaphragm would be at the lower pressure at the discharge side of the regulator. When the time delay device fully closes, it cuts off direct communication between the pressure chamber 14 of the modulating regulator and the outlet chamber 4 thereof. The only communication that would then exist would be through the condition responsive means which would then take control of the modulating regulator and would cause it to move to whatever position they demanded, thus modulating the flow of fuel.

On the other hand, if a manual or automatic cut-off valve were located at a point after the modulating regulator, that is to say, on the discharge side thereof, it is clear that when this valve was closed, that pressure would build up in the pressure chamber 14 of the modulating regulator and the modulating regulator would move to fully closed position. Further, equal pressure would be supplied on both sides of the diaphragm 38 of the time delay device and the time delay device would move downwardly to open position as the weight of the diaphragm would be the only force acting on such diaphragm. Thereafter if the valve on the discharge side of the modulating regulator were opened, the modulating regulator would immediately move to regulated position as its pressure chamber 14 would be in free and substantially unrestricted communication with the discharge chamber 4 of the modulating regulator. When flow occurs, the pressure on the upper side of the diaphragm of the time delay device falls to that at the discharge side of the modulating regulator and the diaphragm rises as pressure fluid flows in the chamber 41 below the diaphragm, finally closing the valve of the time delay device.

It is apparent that by adjusting the needle valve 42 of the time delay device, the time interval may be varied. This time interval is the time between the establishing of flow through the modulating regulator and the time at which the modulating regulator comes under the control of the condition responsive means.

It will be seen that a novel form of control apparatus for heating devices has been disclosed in which the modulating regulator always moves to its regulated pressure position upon the initial flow of one of the ingredients of the combustible mixture, and that thereafter the condition responsive means take control of the modulating regulator and cause it to modulate in accordance with the condition or conditions. In this way there is no chance of either an excessive rush of one of the ingredients to the burner or of an inadequate initial supply of such ingredient. Therefore, there is neither the danger of an over-supply or an under-supply of fuel at the initial flow of fuel to the burner. Obviously, a pilot light or any other means for effecting ignition can be employed in accordance with the usual practice.

Although this invention has been described in considerable detail, it is to be understood that such description is intended as illustrative rather than limiting, as the invention may be variously embodied and is to be interpreted as claimed.

I claim:

1. In an apparatus for controlling one fluid ingredient of a combustible mixture, a fuel line, a main valve in the line, a modulating regulator having a valve for controlling said fluid and having motor means including a pressure chamber provided with a movable wall for operating said valve, said modulating regulator having an inlet and an outlet, time delay means having an open and a closed position for respectively establishing communication between the pressure chamber and the outlet side of said modulating regulator and for interrupting said communication, said time delay means being biased towards open position and after a predetermined interval of time moving to closed position upon the establishing of fluid flow through said modulating regulator, said time delay means having a movable wall one side of which is subjected to pressure from the inlet side of said modulating regulator and the other side of which is subjected to pressure from the outlet side of said modulating regulator, and constricting means for constricting the free flow of fluid for actuating said time delay means to produce the time delay, said time delay means being set in operation upon opening of the main valve, and condition responsive means for varying the relative pressure on opposite sides of said movable wall to control said modulating regulator.

2. In an apparatus for controlling one fluid ingredient of a combustible mixture, a fuel line, a main valve in the line, a modulating regulator having a valve for controlling said fluid and having motor means including a pressure chamber provided with a movable wall for operating said valve, said modulating regulator having an inlet and an outlet, time delay means having an open and a closed position for respectively establishing communication between the pressure chamber and the outlet side of said modulating regulator and for interrupting said communication, said time delay means being biased towards open position and after a predetermined interval of time moving to closed position upon the establishing of fluid flow through said modulating regulator, said time delay means having a movable wall one side of which is subjected to pressure from the inlet side of said modulating regulator and the other side of which is subjected to pressure from the outlet side of said modulating regulator, constricting means for constricting the free flow of fluid for actuating said time delay means to produce the time delay, said time delay means being set in operation upon closing of the main valve, and condition responsive means for varying the relative pressure on opposite sides of said movable wall to control said modulating regulator, said time delay means when in open position forming a by-pass around said condition responsive means, whereby said condition responsive means is effective to control said pressure regulator only after said time delay means has moved to closed position.

3. In an apparatus for controlling the flow of one fluid ingredient of a combustible mixture, a fuel line, a main valve in the line, a modulating valve having an inlet and an outlet for the fluid and having means inherently tending to maintain a predetermined pressure at the outlet side of said modulating valve, said modulating valve having motor means for causing its operation, means for applying the valve outlet pressure to said motor means to operate said motor means, condition responsive means controlling the operation of said motor means, and time delay means adapted to be set in operation upon opening of the main valve, cooperating with said motor means and condition responsive means to interrupt the control of said motor means by said condition responsive means for a predetermined time interval when said modulating valve first begins to function, said time delay means being distinct and separate from said modulating valve.

4. In an apparatus for controlling the flow of one fluid ingredient of a combustible mixture, a fuel line, a main valve in the line, a modulating valve having an inlet and an outlet for the fluid and having motor means inherently controlled by the condition of the fluid on the outlet side of said modulating valve, means for applying the valve outlet pressure to said motor means to operate said motor means, condition responsive means responsive to a second condition for controlling said motor means, and time delay means adapted to be set in operation upon opening of the main valve, effective when said modulating valve first operates to provide a predetermined time interval before the said condition responsive means assumes control of said motor means, said time delay means being distinct and separate from said modulating valve.

5. In an apparatus for controlling the flow of one fluid ingredient of a combustible mixture, a fuel line, a main valve in the line, a modulating valve having an inlet and an outlet for the fluid and having fluid operated motor means inherently controlled by the condition of the fluid at the discharge side of said modulating valve, means for applying the valve outlet pressure to said motor means to operate said motor means, condition responsive means for controlling said motor means, and a time delay transfer means for transferring the control of said motor means to said condition responsive means upon the initial operation of said modulating valve, said time delay means being distinct and separate from said modulating valve, whereby said modulating valve initially responds to the condition of the fluid at the said outlet of said modulating valve and after an interval of time responds to said condition responsive means, said time delay means having a movable wall one side of which is subjected to pressure from the inlet side of said modulating regulator and the other side of which is subjected to pressure from the outlet side of said modulating regulator, constricting means for constricting the free flow of fluid for actuating said time delay means to produce the time delay, said time delay means being set in operation upon opening of the main valve.

6. In an apparatus for controlling one fluid ingredient of a combustible mixture, a fuel line, a main valve in the line, a modulating regulator having a valve for controlling said fluid and having motor means including a pressure chamber provided with a movable wall for operating said valve and having biasing means for biasing said valve towards open position, said modulating regulator having an inlet and an outlet, condition responsive means for controlling the pressure within said pressure chamber to thereby control said modulating regulator, a by-pass valve biased towards open position for by-passing said condition responsive means, and delayed action motor means adapted to be set in operation upon opening of the main valve for closing said by-pass valve after a predetermined interval of time upon the establishing of a fluid flow through said modulating regulator, said delayed action motor means being responsive to the flow through said modulating regulator.

7. In an apparatus for controlling one fluid ingredient of a combustible mixture, a fuel line, a main valve in the line, a modulating regulator having a valve for controlling said fluid and having motor means including a pressure chamber provided with a movable wall for operating said valve, said modulating regulator having an inlet and an outlet, time delay means adapted to be set in operation upon opening of the main valve having an open and a closed position for respectively establishing direct communication between the pressure chamber and the outlet side of said modulating regulator and for interrupting said direct communication, said time delay means being biased towards open position and after a predetermined interval of time moving to closed position upon the establishing of fluid flow through said modulating regulator, said time delay means having a movable wall one side of which is subjected to pressure from the inlet side of said modulating regulator and the other side of which is subjected to pressure from the outlet side of said modulating regulator, and constricting means for constricting the free flow of fluid for actuating said time delay means to produce the time delay, and condition responsive means for varying the relative pressure on opposite sides of said movable wall to control said modulating regulator, said time delay means when in open position forming a by-pass around said condition responsive means, whereby said condition responsive means is effective to control said pressure regulator only after said time delay means has moved to closed position.

8. In an apparatus for controlling one fluid ingredient of a combustible mixture, a fuel line, a main valve in the line, a modulating regulator having a valve for controlling said fluid and having motor means including a pressure chamber having a movable wall for operating said valve and having biasing means for biasing said valve towards open position, said modulating regulator having an inlet and an outlet, condition responsive means for controlling the pressure within said pressure chamber to thereby control said modulating regulator, and an auxiliary valve having motor means including a movable wall with pressure chambers on opposite sides of said movable wall communicating with the inlet and outlet of said modulating regulator, said auxiliary valve being biased open and being closed by the difference in pressure at the inlet and outlet of said modulating regulator when flow occurs through said modulating regulator, said auxiliary valve constituting a by-pass around said condition responsive means when said auxiliary valve is open to thereby render said condition responsive means ineffective to control said modulating regulator when said auxiliary valve is open, said main valve being adapted to control the existence of pressure difference at the inlet and outlet of said modulating regulator.

9. In an apparatus for controlling the flow of one ingredient of fuel in a line, a diaphragm-type main valve in the line including a diaphragm and two pressure chambers on opposite sides thereof, and a valve operated by the diaphragm to a position determined by the difference in said pressures, said valve being adapted to divide the line into high and low pressure sides, means preventing a complete shut-off of said fuel ingredient by the valve, an exhaust conduit into one of said diaphragm chambers to release pressure in said chamber, a second conduit between the said diaphragm chamber and the high pressure side of the line to admit high pressure to said chamber, said main valve being adapted to be operated by the pressure conditions in said chamber obtained through control of pressure flow through said conduits, a pilot control means controlling one of said conduits, said pilot control means including a valve controlling flow through the conduit and means to operate the pilot valve comprising a diaphragm and two pressure chambers on opposite sides thereof, one of them being in communication with the high pressure side of the main valve and the other in communication with the low pressure side, said pilot valve being thereby adapted to be operated to a first position with respect to said conduit upon existence of a difference in pressure between said high and low pressure sides, to provide pressure from one side of the line in said main valve pressure chamber and to place said main valve under control of such pressure, and being adapted to be operated to a second position with respect to said conduit upon at least substantial equalization of pressure on the high and low pressure sides of the main valve, to provide pressure from the other side of the line in said main valve pressure chamber and to place the main valve under control of such pressure, an overall valve in said line adapted to control flow therein to provide said substantially equal pressures on the high and low pressure sides of the main valve and to restore pressure differences therebetween, and time-delay means controlling communication of one of said pilot valve diaphragm chambers with its side of the main valve to delay operation of said pilot valve upon restoration of pressure difference between the high and low sides and thereby to delay operation of said main valve upon opening of said overall valve by retarding the provision of pressure to the pressure chamber of the main valve.

EDWIN A. JONES.